(12) United States Patent
Wakasugi et al.

(10) Patent No.: US 11,248,738 B2
(45) Date of Patent: Feb. 15, 2022

(54) ARM-TYPE SUPPORT DEVICE

(71) Applicant: CKD Corporation, Komaki (JP)

(72) Inventors: Satoshi Wakasugi, Komaki (JP); Shigetaka Matsumoto, Komaki (JP)

(73) Assignee: CKD CORPORATION, Aichi (JP)

(*) Notice: Subject to any disclaimer, the term of this patent is extended or adjusted under 35 U.S.C. 154(b) by 0 days.

(21) Appl. No.: 17/047,348

(22) PCT Filed: Apr. 8, 2019

(86) PCT No.: PCT/JP2019/015340
§ 371 (c)(1),
(2) Date: Oct. 13, 2020

(87) PCT Pub. No.: WO2019/203049
PCT Pub. Date: Oct. 24, 2019

(65) Prior Publication Data
US 2021/0138637 A1 May 13, 2021

(30) Foreign Application Priority Data

Apr. 17, 2018 (JP) .............................. JP2018-079324

(51) Int. Cl.
*F16M 11/20* (2006.01)
*B25J 9/06* (2006.01)
*B25J 9/14* (2006.01)

(52) U.S. Cl.
CPC ............ *F16M 11/2035* (2013.01); *B25J 9/06* (2013.01); *B25J 9/144* (2013.01); *F16M 2200/068* (2013.01)

(58) Field of Classification Search
CPC ......... F16M 11/2035; F16M 2200/063; F16M 2200/068; B25J 9/06; B25J 9/144
See application file for complete search history.

(56) References Cited

U.S. PATENT DOCUMENTS

| | | | |
|---|---|---|---|
| 4,396,344 A | 8/1983 | Sugimoto | |
| 7,207,537 B2* | 4/2007 | Hung | F16M 11/10 248/274.1 |
| 7,464,909 B2* | 12/2008 | Li | F16M 11/08 248/274.1 |

(Continued)

FOREIGN PATENT DOCUMENTS

| | | |
|---|---|---|
| JP | S59005287 U | 1/1984 |
| JP | H10-218588 A | 8/1998 |

(Continued)

OTHER PUBLICATIONS

Supplementary European Search Report for corresponding EP Application No. 19 78 7839 dated Dec. 10, 2021.

*Primary Examiner* — Eret C McNichols
(74) *Attorney, Agent, or Firm* — Tarolli, Sundheim, Covell & Tummino LLP (57) ABSTRACT

An arm-type support device includes a first frame, a second frame, a first arm member, a second arm member, and an actuator. The actuator includes a driving unit, an actuating rod, and a link member. The first arm member, the second arm member, the first frame, and the second frame form a parallel link. The first arm member is hollow and accommodates the actuator and the second arm member.

6 Claims, 8 Drawing Sheets

(56) References Cited

U.S. PATENT DOCUMENTS

| | | | |
|---|---|---|---|
| 7,546,994 B2* | 6/2009 | Altonji | F16M 11/06 |
| | | | 248/276.1 |
| 8,381,609 B2 | 2/2013 | Palau | |
| 8,469,323 B1* | 6/2013 | Deros | F16M 13/022 |
| | | | 248/278.1 |
| 9,004,431 B2* | 4/2015 | Huang | F16M 11/2014 |
| | | | 248/282.1 |
| 2006/0186292 A1* | 8/2006 | Rutherford | F16M 11/2014 |
| | | | 248/276.1 |
| 2010/0327129 A1* | 12/2010 | Chen | F16M 11/2092 |
| | | | 248/121 |
| 2012/0235000 A1* | 9/2012 | Borloz | F16M 11/046 |
| | | | 248/284.1 |
| 2016/0332312 A1* | 11/2016 | Song | B25J 19/0016 |
| 2018/0020825 A1* | 1/2018 | Hung | A47B 21/04 |
| | | | 108/31 |
| 2018/0112820 A1* | 4/2018 | Lau | F16M 13/02 |

FOREIGN PATENT DOCUMENTS

| | | |
|---|---|---|
| JP | 2003-089090 A1 | 3/2003 |
| JP | 2010076089 A | 4/2010 |
| JP | 2018051117 A | 4/2018 |

* cited by examiner

ARM-TYPE SUPPORT DEVICE

RELATED APPLICATIONS

The present invention is a U.S. National Stage under 35 USC 371 patent application, claiming priority to Serial No. PCT/JP2019/015340, filed on 8 Apr. 2019; which claims priority of JP 2018-079324, filed on 17 Apr. 2018, the entirety of both of which are incorporated herein by reference.

TECHNICAL FIELD

The present disclosure relates to an arm-type support device with a parallel link.

BACKGROUND ART

When an article such as a relatively heavy part or parcel is moved, a balancer arm may be used to reduce load on an operator. The balancer arm includes an arm-type support device that is driven to serve as a joint to balance weight. An arm-type support device (articulated device) described in Patent Document 1 includes an arm member that is pivotally connected to a first frame and a second frame, which form a pair, as well as an actuator that pivots the arm member. The arm-type support device described in Patent Document 1 also includes a parallel arm member that is spaced apart from the arm member and extends in parallel with the arm member. The proximal end of the parallel arm member is pivotally connected to the first frame and the distal end of the parallel arm member is pivotally connected to the second frame. The first frame, the second frame, the arm member, and the parallel arm member form a parallel link. When an article such as a parcel is moved, the parallel link pivots the arm member and the parallel arm member about the first frame to translate the second frame. The actuator balances weight in this case.

PRIOR ART DOCUMENT

Patent Document

Patent Document 1: Japanese Laid-Open Patent Publication No. 2010-76089

SUMMARY OF THE INVENTION

Problems that the Invention is to Solve

The arm-type support device changes the position of the parallel link as the arm member and the parallel arm member are pivoted. The arm member, the parallel arm member, and the first and second frames may form a wide space in accordance with the shape of the parallel link, allowing foreign material to enter the arm-type support device from the space.

It is an object of the present disclosure to provide an arm-type support device that restricts the entry of foreign material.

Means for Solving the Problems

An arm-type support device that achieves the above object includes a first frame and a second frame; a first arm member that includes a first end and a second end, in which the first end is supported by the first frame to be pivotal about a first pivot shaft supported by the first frame, and the second end is supported by the second frame to be pivotal about a second pivot shaft supported by the second frame; an actuator configured to move the second frame by pivoting the first arm member about the first frame; and a second arm member that includes a first end and a second end and extends in parallel with an axis of the first arm member, in which the first end of the second arm member is supported by the first frame to be pivotal about a third pivot shaft supported by the first frame, and the second end of the second arm member is supported by the second frame to be pivotal about a fourth pivot shaft supported by the second frame. The actuator includes a driving unit; an actuating rod configured to move in an axial direction of the first arm member in accordance with actuation of the driving unit; and a link member that includes a distal end and a proximal end, in which the proximal end and the first end of the second arm member are pivotally connected to the first frame, and the distal end is connected to the actuating rod. The first arm member, the second arm member, the first frame, and the second frame form a parallel link. The first arm member is hollow and accommodates the actuator and the second arm member.

MODES FOR CARRYING OUT THE INVENTION

An arm-type support device according to one embodiment will now be described with reference to FIGS. 1 to 8.

Figure 1:
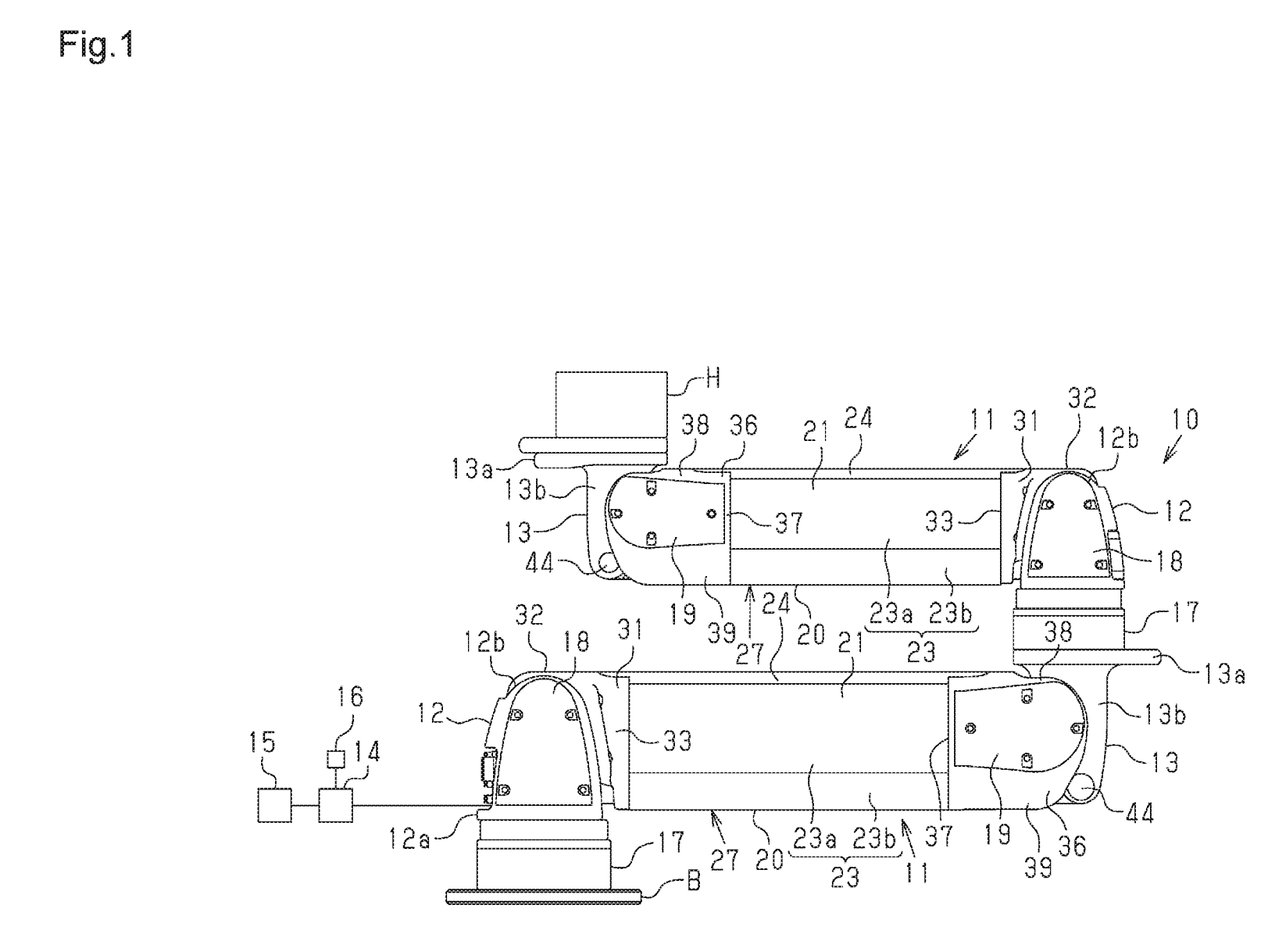
FIG. 1 is a diagram of a balancer arm according to one embodiment when in an initial position.

As shown in FIG. 1, a balancer arm 10 includes plural (two in the present embodiment) arm-type support devices 11. For the illustrative purposes, the two arm-type support devices 11 will be referred to as a first arm-type support device 11 and a second arm-type support device 11 in order from the proximal end toward the distal end. The first arm-type support device 11 is attached to a base B at its proximal end. The second arm-type support device 11 is attached to a workpiece grip H at its distal end.

The arm-type support devices 11 each include a first frame 12, a second frame 13, which form a pair, as well as a first arm member 20 that is pivotally connected to the first frame 12 and the second frame 13. The arm-type support devices 11 are each configured to pivot the second frames 13 about the first frames 12. For example, when an operator moves workpiece (not shown) gripped by the workpiece grip H toward an operation point, the first and the second arm-type support devices 11 each actuate in accordance with the height of the workpiece to balance weight.

Figure 2:
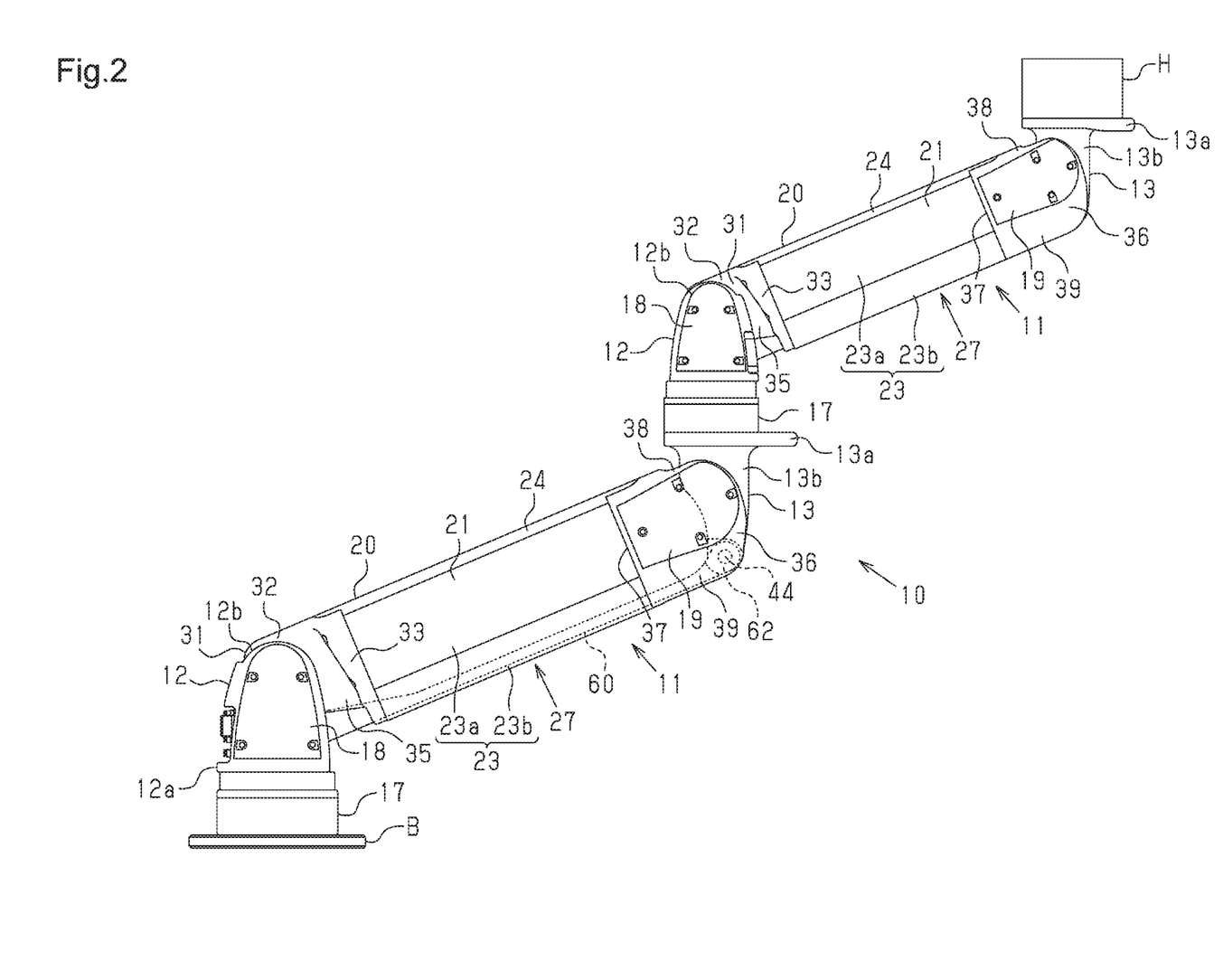
FIG. 2 is a diagram showing the balancer arm in FIG. 1 when the position is changed.

FIG. 1 shows the first arm-type support device 11 and the second arm-type support device 11 in the initial position. The first and second arm-type support devices 11 in the initial position have the first frames 12 and the second frames 13 at a substantially horizontal position. In FIG. 2, the first arm-type support device 11 and the second arm-type support device 11 have the second frames 13 moved upward from the first frames 12 in the vertical direction.

The arm-type support device 11 is actuated by the fluid pressure of fluid such as compressed air or hydraulic oil. In this embodiment, air is used as the fluid. The arm-type support devices 11 are each supplied with compressed air by a pneumatic unit 14. The pneumatic unit 14 is connected to a compressor 15. The pneumatic unit 14 is also connected to a controller 16. The controller 16 switches on and off the pneumatic unit 14 and adjusts the pressure of compressed air. The controller 16 calculates parameters of compressed air such as pressure, which is supplied to the first and second arm-type support devices 11, and supplies compressed air to the first and second arm-type support devices 11 in order to balance weight.

Figure 3:
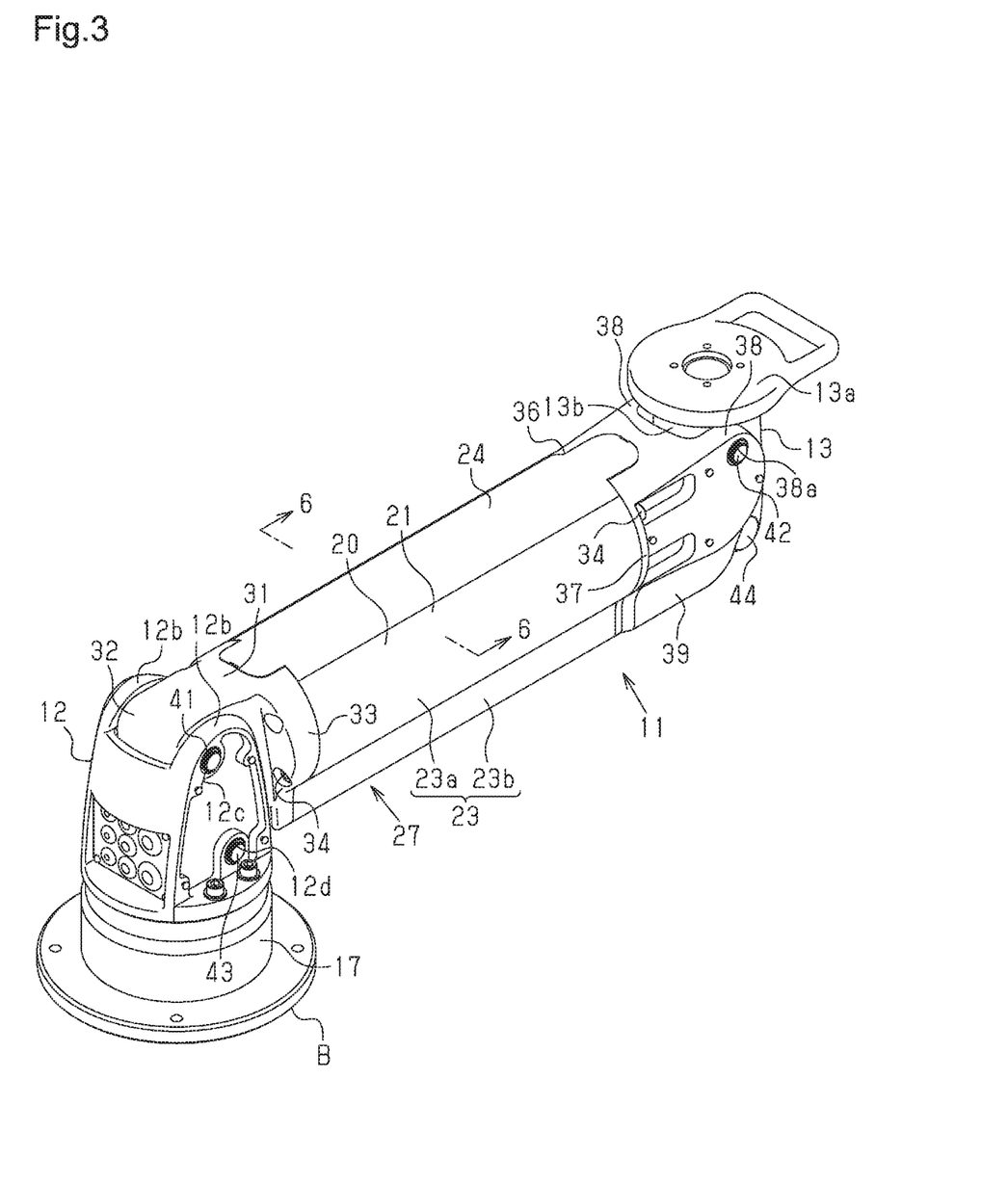
FIG. 3 is a perspective view of an arm-type support device.

As shown in FIG. 3, the arm-type support device 11 includes the first frame 12 and the second frame 13, which form a pair, as well as the first arm member 20 with a first end and a second end. The first end of the first arm member 20 is pivotally supported by the first frame 12. The second end of the first arm member 20 is pivotally connected to the second frame 13.

Figure 5:
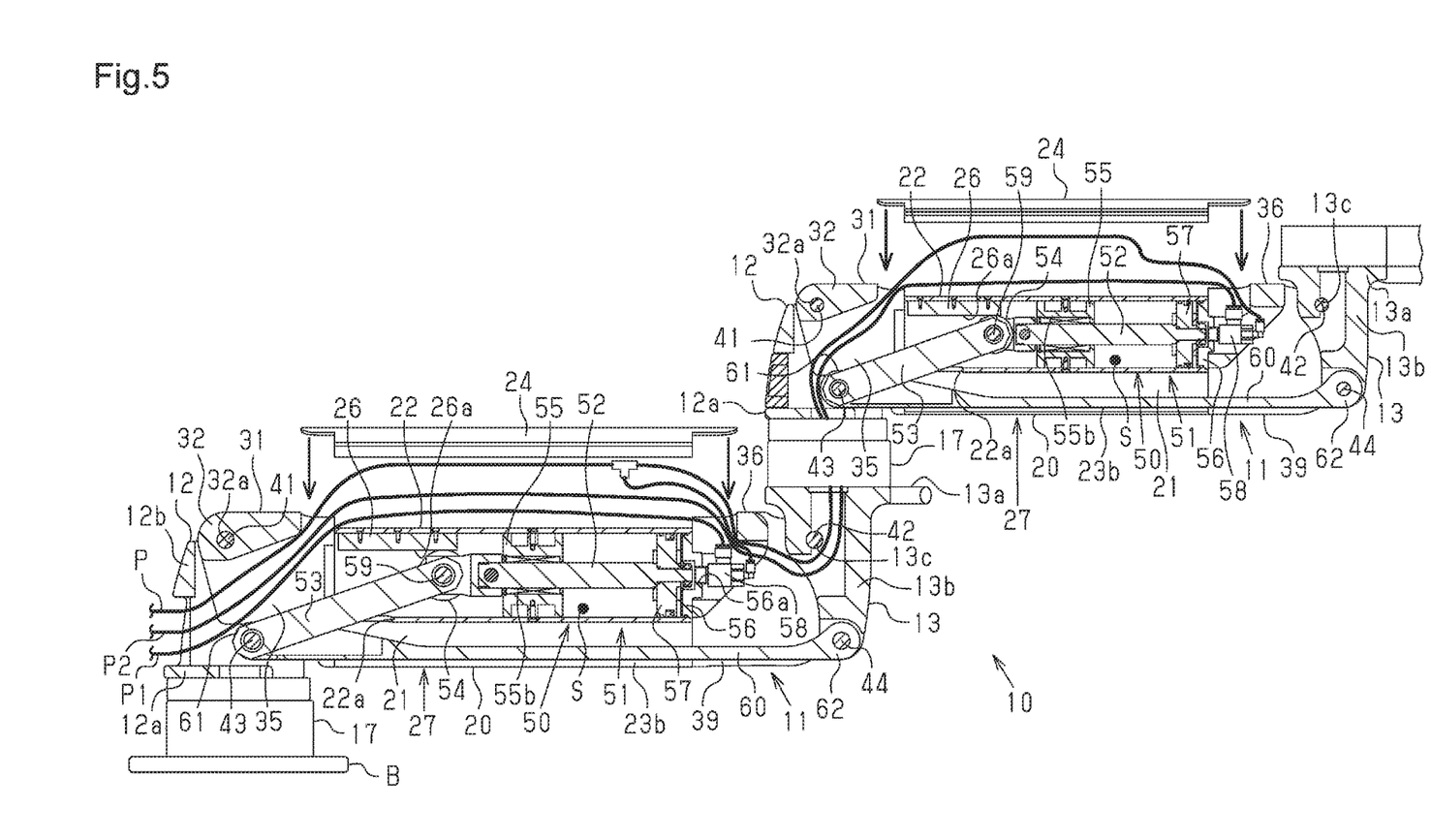
FIG. 5 is a cross-sectional view showing the arm-type support device in FIG. 3.

As shown in FIG. 5, the arm-type support device 11 includes an actuator 50 that moves the second frame 13 by pivoting the first arm member 20 about the first frame 12. The arm-type support device 11 also includes a second arm member 60 that includes a first end and a second end. The second arm member 60 is spaced apart from the first arm member 20 and extends in parallel with the first arm member 20. The second arm member 60 has a first end that is pivotally supported by the first frame 12. The second arm member 60 has a second end that is pivotally supported by the second frame 13.

Figure 4:
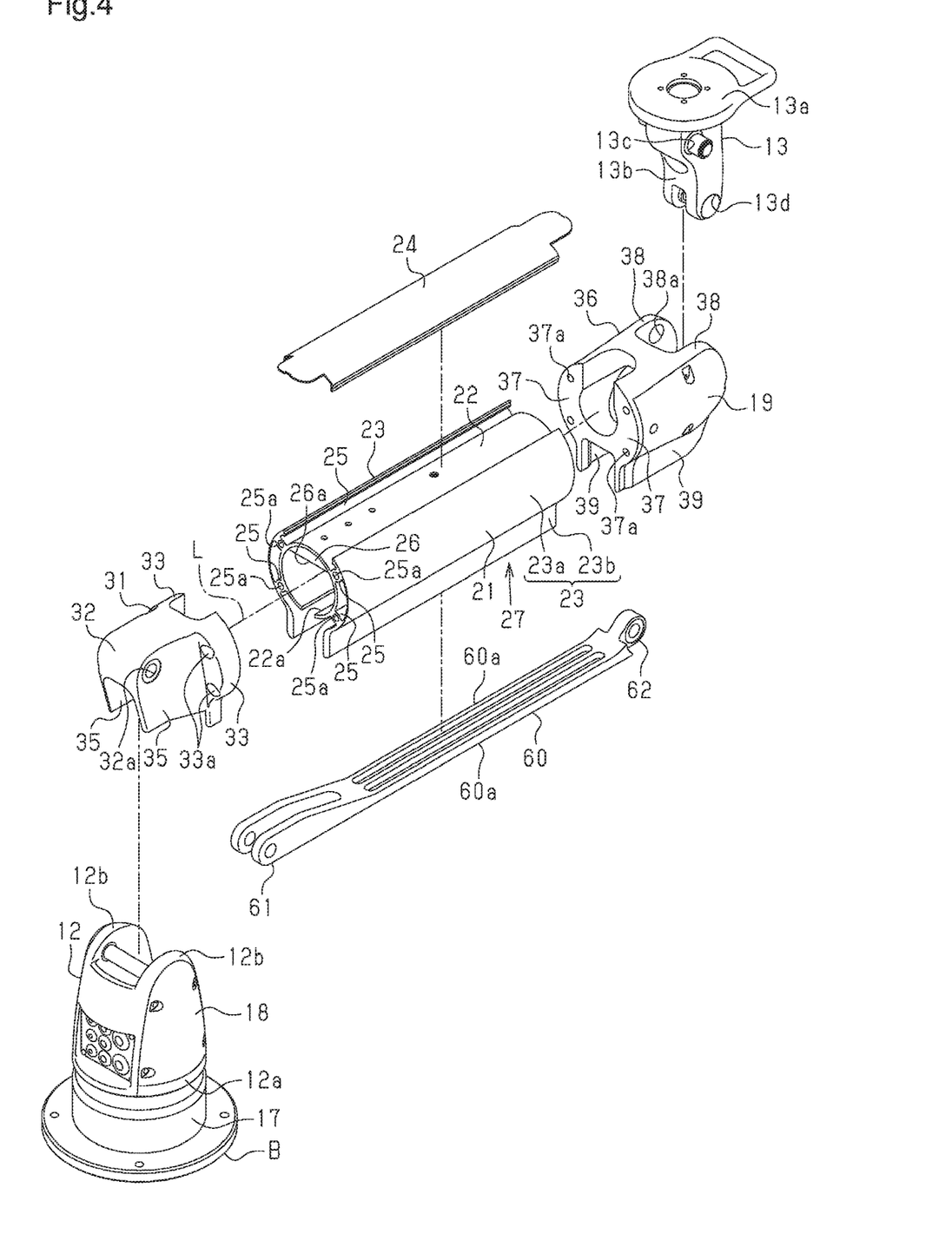
FIG. 4 is an exploded perspective view showing the arm-type support device in FIG. 3.

As shown in FIG. 3 and FIG. 4, the first frame 12 includes a disk-shaped base plate 12a at the lower end and two first shaft supports 12b extending upward from the base plate 12a. The first shaft supports 12b are opposed to each other with a space. The upper portion of each first shaft support 12b includes a first through-hole 12c. The lower portion of the first shaft support 12b, which is arranged downward from the first through-hole 12c, includes a second through-hole 12d. The base plate 12a of the first frame 12 is rotationally supported by a rotation joint 17 with a bearing (not shown).

The second frame 13 includes a disk-shaped support plate 13a at the upper end and a second shaft support 13b that is flat and extends downward from the support plate 13a in the vertical direction. The upper portion of the second shaft support 13b includes a third through-hole 13c that extends through the second shaft support 13b in its thickness direction. The lower portion of the second shaft support 13b, which is arranged downward from the third through-hole 13c, includes a fourth through-hole 13d that extends through the second shaft support 13b in the thickness direction.

As shown in FIG. 4, the first arm member 20 includes a hollow arm body 21, a first member 31 connected to one end of the arm body 21 in its axial direction, and a second member 36 connected to the other end of the arm body 21 in the axial direction. The arm body 21 is an aluminum extruded material.

The arm body 21 includes a cylindrical tube 22, two covers 23 that sandwich the tube 22, and a lid 24 (refer to FIG. 5) that closes the gap between the upper edges of the covers 23. The axial direction of the tube 22 in which central axis L extends is aligned with the axial direction of the first arm member 20. The tube 22 includes a slit 22a at one end, namely, a first end of the axial direction. The inner surface of the tube 22 includes a flat guide member 26 fixed to its upper surface at the first end of the axial direction. The guide member 26 is fixed to the tube 22 by a screw threaded into the guide member 26 from the outer surface of the tube 22. The guide member 26 includes a guide surface 26a that is a flat surface facing central axis L of the tube 22.

The covers 23 are each connected to the outer surface of the tube 22 by two connection units 25. Each connection unit 25 includes internal thread holes 25a recessed from the opposite ends in the axial direction. The length of each cover 23 in the longitudinal direction is the same as the length of the tube 22 in the axial direction. The cover 23 includes a cover body 23a that has an arcuate cross section orthogonal to central axis L of the tube 22. The cover body 23a faces the outer surface of the tube 22. The cover 23 also includes a guide piece 23b that extends downward from the lower edge of the cover body 23a in the vertical direction. The guide piece 23b has a straight cross section orthogonal to central axis L of the tube 22.

The center of the arc of the cover body 23a is aligned with the center of the tube 22. The outer surface of the tube 22 and the inner surface of the cover body 23a define clearance that extends over the entire tube 22 in the axial direction excepting the connection unit 25. The upper edges of the cover bodies 23a and the guide pieces 23b of the covers 23 are opposed to each other with a fixed space.

Figure 6:
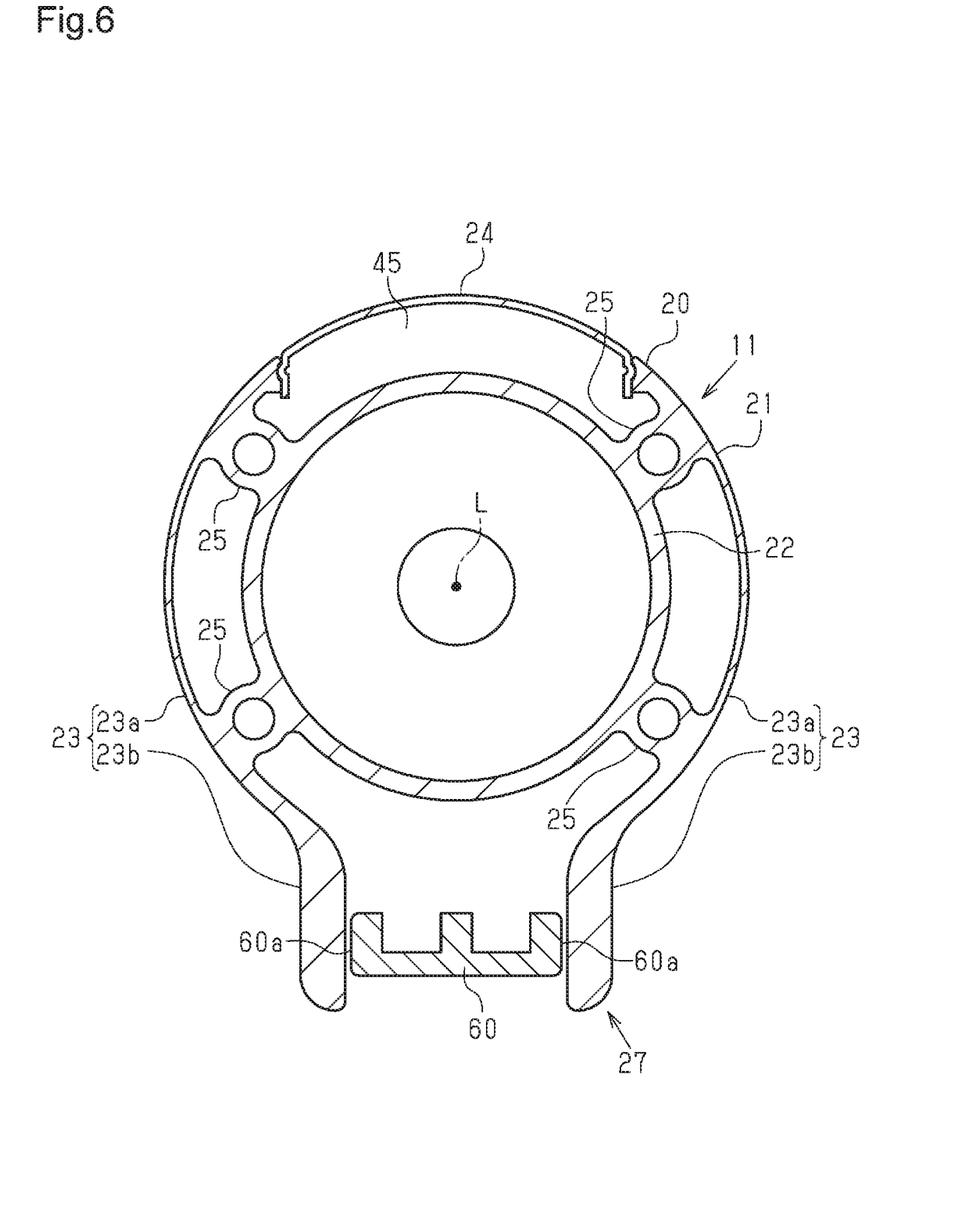
FIG. 6 is a cross-sectional view taken along line 6-6 in FIG. 3, showing the arm-type support device.

As shown in FIG. 3 and FIG. 4, the rectangular lid 24 is curved in the transverse direction. The lid 24 is flat having a longitudinal axis that extends in the axial direction of the tube 22. The lid 24 is arranged between the upper edges of the cover bodies 23a to close the gap between the cover bodies 23a. As shown in FIG. 6, the inner surface of the lid 24, the outer surface of the tube 22, and the side surfaces of the two connection units arranged in the upper portion define a wiring space 45.

As shown in FIG. 4, the first member 31 is connected to one end, namely, a first end of the arm body 21 in the axial direction. The first member 31 includes a first flange 33 having an inverted U-shape, a flat first end 32, and two first guide pieces 35. The first end 32 projects from the upper end of the first flange 33 in the vertical direction. The first guide pieces 35 extend vertically downward from the ends of the first end 32 in the thickness direction. The first end 32 includes a shaft hole 32a extending through the first end 32 in the thickness direction. The first flange 33 includes bolt holes 33a extending through the first flange 33 in the thickness direction. The first guide pieces 35 are opposed to each other with a fixed space. Bolts 34 inserted into the bolt holes 33a of the first flange 33 are threaded into the internal thread holes 25a formed in the connection units 25 of the arm body 21. This connects the first member 31 to the arm body 21.

The second member 36 is connected to the other end, namely, a second end of the arm body 21, in the axial direction. The second member 36 includes two second flanges 37 that are substantially H-shaped, two second ends that project from the second flange 37, and two second guide pieces 39 that extend vertically downward from the second ends 38. The second ends 38 each include a shaft hole 38a extending through the second end 38 in its thickness direction. The second flange 37 includes bolt holes 37a extending through the second flange 37 in the thickness direction. The second guide pieces 39 are opposed to each other with a fixed space. Bolts 34, inserted into the bolt holes 37a of the second flanges 37, are threaded into the internal thread holes 25a formed in the connection units 25 of the arm body 21. This connects the second member 36 to the arm body 21.

Thus, as shown in FIG. 3, the first arm member 20 includes the first end 32 formed by the first member 31 at the first end of the axial direction and the second ends 38 formed by the second member 36 at the second end of the axial direction. The flat first end 32 is arranged at the first end of the first arm member 20 in the axial direction and the bifurcated second ends 38 are arranged at the second end of the first arm member 20 in the axial direction.

The first end 32 of the first arm member 20 is arranged between the two first shaft supports 12b of the first frame 12. A first pivot shaft 41 is inserted into the first through-holes 12c of the first shaft supports 12b and the shaft hole 32a of the first end 32. The first pivot shaft 41 supported by the first shaft supports 12b supports the first end 32 of the first arm member 20 to be pivotal about the first frame 12.

The second shaft support 13b of the second frame 13 is arranged between the second ends 38 of the first arm member 20. A second pivot shaft 42 is inserted into the third through-hole 13c of the second shaft support 13b and the shaft holes 38a of the second ends 38. The second pivot shaft 42 supports the second ends 38 of the first arm member 20 to be pivotal about the second frame 13.

Figure 7:
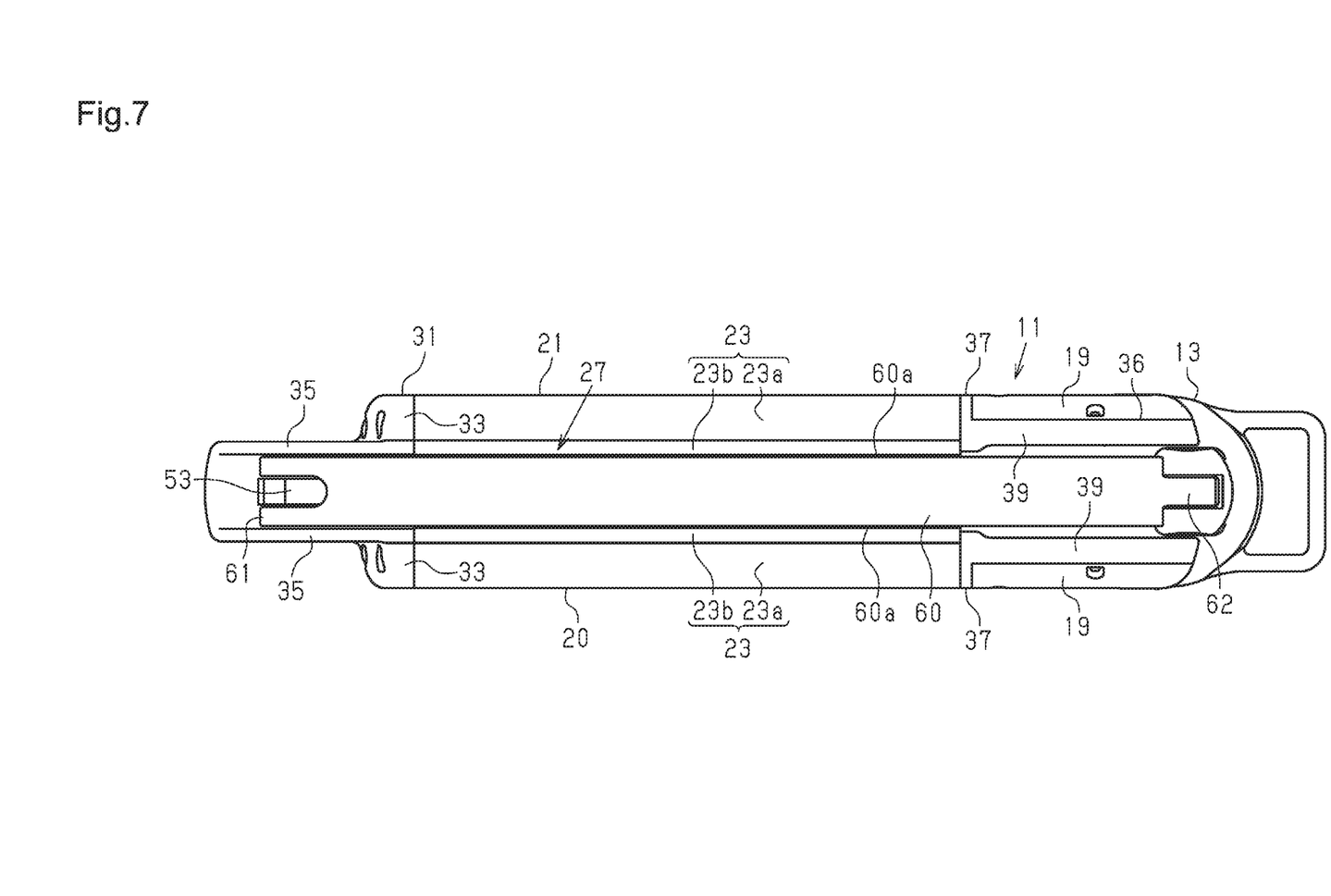
FIG. 7 is a diagram showing the arm-type support device when viewed from the direction toward the second arm member.

As shown in FIG. 7, the first arm member 20 includes two arm guides 27 at the bottom side. Each arm guide 27 includes the first guide piece 35 of the first member 31, the guide piece 23b of the arm body 21, the second guide piece 39 of the second member 36, all of which are coupled together in the axial direction of the first arm member 20. The arm guides 27 are opposed to each other with a space and extend over the entire first arm member 20 in the axial direction. The opposing inner surfaces of the arm guides 27 define an opening.

As shown in FIG. 5, the actuator 50 includes a driving unit 51, an actuating rod 52, and a link member 53. The actuating rod 52 is connected to the driving unit 51 and moves in the axial direction of the tube 22. The link member 53 has a distal end and a proximal end. The proximal end of the link member 53 is pivotally connected to the first frame 12. The link member 53 extends to the actuating rod 52 in an inclined manner. The actuator 50 further includes a guide roller 54 connected to the actuating rod 52. The guide roller 54 is pivotally connected to the distal end of the link member 53.

The actuator 50 will now be described in detail. A rod cover 55 is inserted into a substantially central portion of the tube 22 in the axial direction. The rod cover 55 is fixed to the tube 22 by a screw threaded into the rod cover 55 at the outer side of the tube 22. The actuating rod 52 is supported on the inner surface of the rod cover 55 by a bearing 55b. Thus, the actuating rod 52 extends through the rod cover 55. The rod cover 55 supports the actuating rod 52 so that the actuating rod 52 moves in the axial direction of the first arm member 20.

A head cover 56 is fixed to a portion of the tube 22 that faces the second member 36 in the axial direction. Inside the tube 22, the rod cover 55 and the head cover 56 define a piston chamber S. The piston chamber S accommodates a piston 57 that can move in the axial direction of the tube 22. The piston 57 is connected to one end, namely, a first end of the actuating rod 52. The piston 57 moves in the axial direction of the tube 22 as the actuating rod 52 moves.

The head cover 56 includes a supply-discharge port 56a for compressed air, and the supply-discharge port 56a is connected to a first air supply pipe P1. The compressor 15 supplies and discharges compressed air to and from the piston chamber S via the first air supply pipe P1 so as to adjust the pressure in the piston chamber S. The supply-discharge port 56a is connected to an on-off valve 58. The on-off valve 58 is connected to a pilot air pipe P.

The first air supply pipe P1 extends from the compressor 15 outside the arm-type support device 11. The first air supply pipe P1 extends through the space between the first shaft supports 12b of the first frame 12 and the space between the first guide pieces 35 of the first member 31, and is drawn into the first arm member 20. The first air supply pipe P1 inside the first arm member 20 extends through the wiring space 45 and the space between the second flanges 37 of the second member 36, and is connected to the supply-discharge port 56a. The pilot air pipe P is drawn into the arm-type support device 11 and connected to the on-off valve 58 in the same manner as the first air supply pipe P1.

The pilot air pipe P supplies pilot air to the on-off valve 58. The on-off valve 58 is open when air flows in the first air supply pipe P1 and the pilot air pipe P supplies pilot air to the on-off valve 58. The on-off valve 58 will be closed when the compressor 15 stops and air does not flow in the first air supply pipe P1 or the pilot air pipe P to stop the supply of pilot air to the on-off valve 58.

When the operator operates the balancer arm 10 and the height and the radius of movement of the arm-type support device 11 are changed, the position of the parallel link, which is described below, is changed. As the position of the parallel link is changed, the piston 57 is moved by the link member 53 and the actuating rod 52. When the capacity of the piston chamber S is changed as the piston 57 moves, the controller 16 controls the pressure of compressed air, which is supplied to the piston chamber S, in accordance with the capacity change.

Specifically, when the balancer arm 10 is operated and the second frame 13 moves upward from the initial position, the piston 57 moves toward the rod cover 55. Then, the capacity of the piston chamber S that is defined by the piston 57 and the head cover 56 increases. The pressure of compressed air supplied to the piston chamber S is increased in accordance with this increase in capacity. The increased pressure of compressed air acts on the piston 57 to increase the force to move toward the rod cover 55. This assists the force to raise the second frame 13 by the actuating rod 52, the link member 53, and the parallel link and balances weight.

A second air supply pipe P2 that supplies and discharges air to and from the second arm-type support device 11 extends through the space between the first shaft supports 12b of the first frame 12 and the space between the first guide pieces 35 of the first member 31 in the first arm-type support device 11, and is drawn into the first arm member 20. The second air supply pipe P2 extends through the wiring space 45, the space between the second flanges 37 of the second member 36, and the second frame 13 inside the first arm member 20, and is then drawn into the first frame 12 of the second arm-type support device 11. The second air supply pipe P2 extends through the space between the first shaft supports 12b of the first frame 12 and the space between the first guide pieces 35 of the first member 31, and is drawn into the first arm member 20. The second air supply pipe P2 inside the first arm member 20 extends through the wiring space 45 and the space between the second flanges 37 of the second member 36, and is connected to the supply-discharge port 56a. The pilot air pipe P is drawn from the first arm-type support device 11 into the second arm-type support device 11, and then connected to the on-off valve 58.

The link member 53 is shaped to be a straight rod. The proximal end of the link member 53 is connected to a third pivot shaft 43 inserted into the second through-hole 12d of the first frame 12. The link member 53 extends through the slit 22a of the tube 22 and projects outward from the tube 22 toward the first frame 12. The link member 53 is inclined relative to the direction in which the actuating rod 52 is extended. The proximal end of the link member 53 and a first end 61 of the second arm member 60, which is described below, are supported by the first frame 12 to be pivotal about the third pivot shaft 43.

The guide roller 54 is rotationally connected, by a pivot shaft 59, to an end of the actuating rod 52 that is connected to the link member 53. The distal end of the link member 53 connected to the actuating rod 52 is connected by the pivot shaft 59 to be pivotal about the rotation center of the guide roller 54. When the position of the parallel link is changed, the guide roller 54 is rotated while being pressed against the guide surface 26a of the guide member 26 that is fixed to the inner surface of the tube 22.

The second arm member 60 will now be described. The second arm member 60 has a longitudinal axis that extends in parallel with the axis of the first arm member 20. The second arm member 60 includes the first end 61, which is pivotally supported by the first frame 12, and a second end 62 that is pivotally supported by the second frame 13. The second arm member 60 is shaped to be a square bar. The first end 61 of the second arm member 60 is pivotally connected to the first frame 12 by the third pivot shaft 43, and the second end 62 of the second arm member 60 is pivotally connected to the second frame 13 by a fourth pivot shaft 44. The fourth pivot shaft 44 is supported by the fourth through-hole 13d of the second frame 13.

The first frame 12, the second frame 13, the first arm member 20, and the second arm member 60 form a parallel link that is shaped to be a parallelogram. The parallel link pivots the first arm member 20 and the second arm member 60 about the first frame 12 to translate the second frame 13. The first arm member 20 and the second arm member 60 form the long sides of the parallelogram, and the first frame 12 and the second frame 13 form the short sides of the parallelogram.

As shown in FIG. 3 and FIG. 4, the first frame 12 includes first cover members 18 that cover the outer surfaces of the two first shaft supports 12b. The first cover members 18 have a longitudinal axis that extends in the vertical direction. The first cover members 18 cover the first pivot shaft 41 and the third pivot shaft 43. The second frame 13 includes second cover members 19 that cover two outer surfaces of the second shaft support 13b in the thickness direction. The second cover members 19 have a longitudinal axis that extends in the axial direction of the first arm member 20. The second cover members 19 cover the second pivot shaft 42.

As shown in FIG. 7, the second arm member 60 is arranged between the two first guide pieces 35 of the first member 31, the two guide pieces 23b of the arm body 21, and the two second guide pieces 39 of the second member 36. In other words, the second arm member 60 is arranged between the two arm guides 27 of the first arm member 20. The first arm member 20 includes the arm guides 27 that sandwich the second arm member 60 and are opposed to each other. The second arm member 60 closes the opening defined by the inner surfaces of the arm guides 27. The second arm member 60 also serves as a lid that closes the bottom side of the first arm member 20. In the initial position of the first arm member 20, the second arm member 60, excluding the second end 62, is accommodated in the first arm member 20.

As shown in FIG. 6 and FIG. 7, only a slight gap that allows the second arm member 60 to change its position is formed between side surfaces 60a of the second arm member 60 in the transverse direction and the corresponding inner surfaces of the first guide piece 35, between the side surfaces 60a of the second arm member 60 and the corresponding inner surfaces of the guide pieces 23b, and between the side surfaces 60a of the second arm member 60 and the corresponding inner surfaces of the second guide pieces 39. The "slight gap" refers to a gap that the human finger cannot enter.

As shown in FIG. 5, a rotation joint 17 is connected to the support plate 13a of the second frame 13 of the first arm-type support device 11. The rotation joint 17 supports the base plate 12a of the first frame 12 of the second arm-type support device 11 by a bearing (not shown). The second arm-type support device 11 is shorter than the first arm-type support device 11 in the axial direction and includes the first arm member 20 (tube 22) that has a smaller diameter than the first arm-type support device 11.

A second air supply pipe P2 that supplies and discharges air to and from the second arm-type support device 11 extends through the space between the first shaft supports 12b of the first frame 12 and the space between the first guide pieces 35 of the first member 31 in the first arm-type support device 11, and is drawn into the first arm member 20. The first air supply pipe P1 extends through the wiring space 45, the space between the second flanges 37 of the second member 36, and the second frame 13 inside the first arm member 20, and is then drawn into the first frame 12 of the second arm-type support device 11. The second air supply pipe P2 extends through the space between the first shaft supports 12b of the first frame 12 and the space between the first guide pieces 35 of the first member 31, and is drawn into the first arm member 20. The second air supply pipe P2 inside the first arm member 20 extends through the wiring space 45 and the space between the second flanges 37 of the second member 36, and is connected to the supply-discharge port 56a. The pilot air pipe P is drawn from the first arm-type support device 11 into the second arm-type support device 11, and then connected to the on-off valve 58.

The operation of the arm-type support device 11 will now be described.

As shown in FIG. 1, the arm-type support device 11 in the initial position includes the piston chamber S supplied with compressed air to balance weight and holds the first frame 12 and the second frame 13 substantially at the same height.

When the operator operates the balancer arm 10 so that the height and the radius of movement of the arm-type support device 11 are changed, the position of the parallel link is changed and the piston 57 is moved by the link member 53 and the actuating rod 52. Then, the capacity of the piston chamber S is changed to cause a pressure change. The controller 16 operates the compressor 15 and the pneumatic unit 14 for pressure control in accordance with the pressure change caused by the movement of the piston 57. This maintains weight balance and reduces a weight load on the operator.

Figure 8:
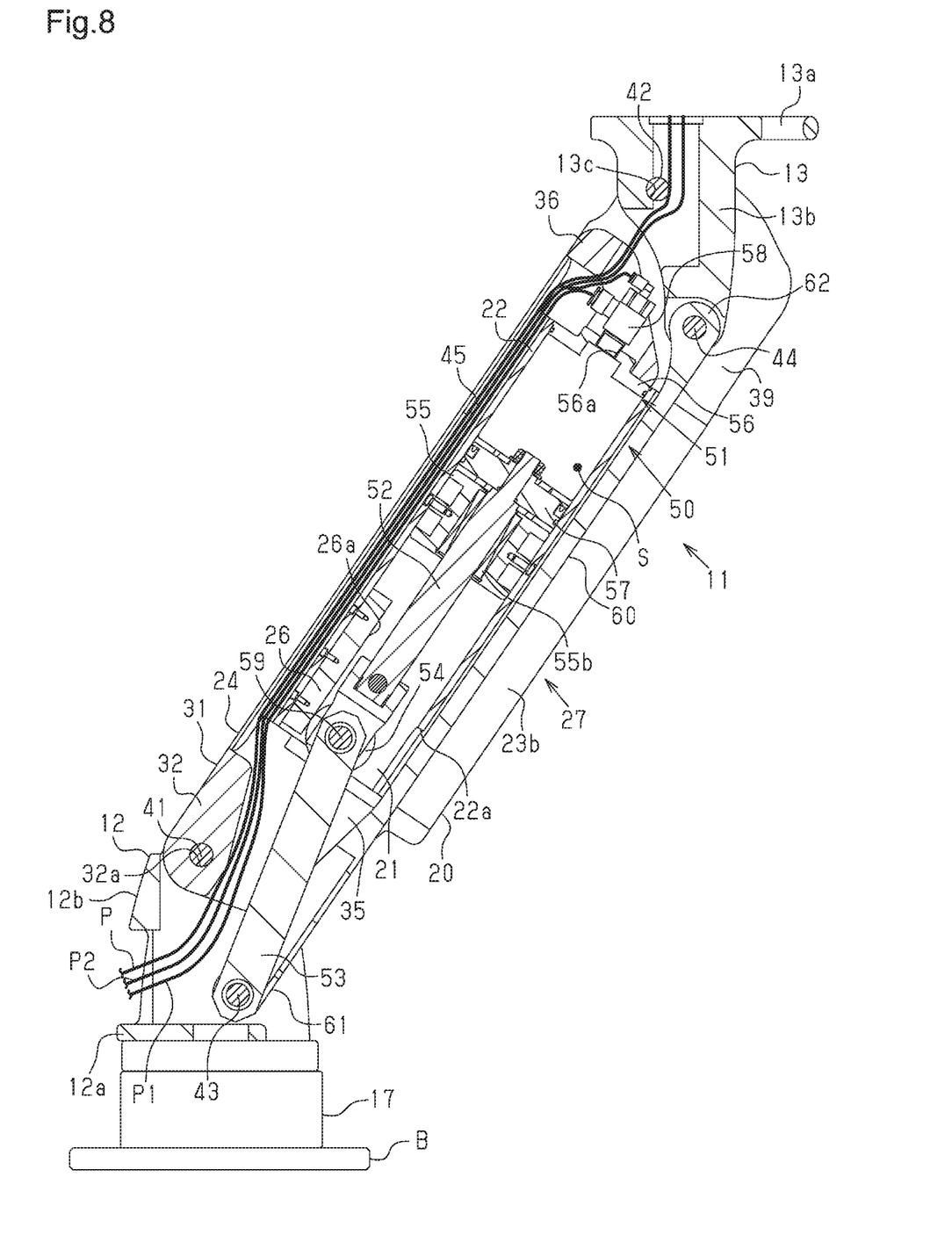
FIG. 8 is a cross-sectional view showing the balancer arm when the position is changed.

In this case, the first end 32 of the first arm member 20 pivots about the first shaft supports 12b of the first frame 12 as shown in FIG. 2 and FIG. 8. The first end 32 of the first arm member 20 and the first frame 12 have only a slight gap in the axial direction of the first arm member 20 and between the two end surfaces of the first end 32 in the thickness direction and the inner surfaces of the first shaft supports 12b. The second frame 13 pivots about the second ends 38 of the first arm member 20. The second ends 38 of the first arm member 20 and the second frame 13 have only a slight gap in the axial direction of the first arm member 20 and between the second shaft support 13b and the opposing surfaces of the second ends 38 in the thickness direction of the second ends 38. Human fingers will not be caught in the slight gap.

The first end 61 of the second arm member 60 pivots about the first shaft supports 12b of the first frame 12. The first end 61 of the second arm member 60 is covered with the first frame 12. The second end 62 of the second arm member 60 changes the position between the second ends 38 of the first arm member 20. The second end 62 of the second arm member 60 and the second frame 13 have only a slight gap in the axial direction of the first arm member 20 and between the two end surfaces of the second end 62 in the thickness direction and the inner surfaces of the second guide pieces 39.

Further, the second arm member 60 excluding the first end 61 and the second end 62 has only a slight gap, which allows the second arm member 60 to change its position, between the side surfaces 60a and the corresponding inner surfaces of the arm guides 27. Human fingers will not be caught in the slight gap. The second arm member 60, when changing the position in the axis direction of the first arm member 20, is guided by the inner surfaces of the arm guides 27.

The above-described embodiment has the following advantages.

(1) In the arm-type support device 11, the first arm member 20 forms one of the two long sides of the parallel link. The first arm member 20 accommodates the second arm member 60 that forms the other long side. When the arm-type support device 11 is actuated, the second arm member 60 pivots inside the first arm member 20. Thus, if the angles of the second arm member 60 that are formed with the first frame 12 and the second frame 13 are changed as the parallel link changes its position, there will be no wide gap between the second arm member 60 and the first frame 12 or the second frame 13 in the axial direction of the first arm member 20, thereby restricting the entry of foreign material into the arm-type support device 11 through the gap.

(2) The first arm member 20 accommodates the second arm member 60 that forms one of the long sides of the parallel link so that there will be no wide gap between the second arm member 60 and the first frame 12 or the second frame 13 in the axial direction of the first arm member 20. This structure is preferable especially for a balancer arm 10 installed in an environment in which arm-type support devices 11 are proximate to the floor and foreign material is easy to enter as in the case where the balancer arm 10 is installed on the floor.

(3) The second arm member 60 is arranged between the two arm guides 27 of the first arm member 20. The second arm member 60 has only a slight gap, which allows the second arm member 60 to change its position, between the side surfaces 60a and the corresponding inner surfaces of the arm guides 27. Thus, there will be no wide gap between the first arm member 20 and the second arm member 60, thereby restricting the entry of foreign material into the arm-type support device 11 through the gap.

(4) The first end 32 of the first arm member 20 is sandwiched and supported by the two first shaft supports 12b of the first frame 12. Thus, the first end 32 is pivotally supported with only a slight gap between the first end 32 and the first shaft supports 12b. The second shaft support 13b of the second frame 13 is sandwiched and supported by the two second ends 38 of the first arm member 20. Thus, the second ends 38 are pivotally supported with only a slight gap between the second ends 38 and the second shaft support 13b. This restricts the entry of foreign material between the first arm member 20 and first frame 12 and between the first arm member 20 and the second frame 13.

(5) The tube 22 accommodates the piston chamber S, the actuating rod 52, the link member 53, the guide roller 54, and the piston 57 of the actuator 50. Thus, the first arm member 20 can be used for a cylinder tube that forms the actuator 50. This simplifies the structure of the first arm member 20 in comparison with when the cylinder tube that forms the actuator 50 is separately arranged in the first arm member 20.

(6) The rod cover 55 is arranged inside the tube 22 of the first arm member 20. The actuating rod 52 extending through the rod cover 55 is supported by the rod cover 55. The rod cover 55 guides the actuating rod 52 to move in the axial direction of the first arm member 20 and allows the parallel link to actuate smoothly.

(7) The on-off valve 58 is arranged in the head cover 56 of the first arm member 20. The on-off valve 58 is supplied with pilot air that is compressed air supplied to the piston chamber S. When the supply of compressed air stops and the supply of pilot air to the on-off valve 58 stops, the on-off valve 58 will be closed to maintain the pressure in the piston chamber S. Thus, if the power is turned off in the place where the balancer arm 10 has been installed, the on-off valve 58 prevents the balancer arm 10 from falling.

(8) The arm body 21 of the first arm member 20 and the lid 24 define the wiring space 45 inside the first arm member 20. This allows the first air supply pipe P1, the second air supply pipe P2, and the pilot air pipe P to be arranged inside the first arm member 20, thereby preventing the pipes from projecting out of the arm-type support device 11. The pipes do not hinder the operation of the arm-type support device 11.

The above-described embodiment may be modified as follows.

The lower ends of the two guide pieces 23b in the first arm member 20 may be connected to each other by a separate member to configure the first arm member 20 to be tubular. The first arm member 20 may accommodate the second arm member 60 surrounded by the first arm member 20.

In the embodiment, the balancer arm 10 includes two arm-type support devices 11. Instead, the number of arm-type support devices 11 may be one or more than two.

The on-off valve 58 of the first arm member 20 may be omitted.

The first end 32 of the first arm member 20 may be bifurcated, and the first shaft support 12b of the first frame 12 may be flat and sandwiched by the bifurcated first end 32. Further, the second end 38 of the first arm member 20 may be flat, and the second shaft support 13b of the second frame 13 may be bifurcated to sandwich the second ends 38.

The actuator 50 may control the piston 57 in the piston chamber S by a method other than the supply of compressed air. For example, a gas spring chamber or a spring chamber may be defined in tube 22, and the piston 57 may be controlled by a gas spring or a spring. Alternatively, an accumulator method may be used.

Fluid supplied to the piston chamber S may be oil.

The invention claimed is:
1. An arm-type support device comprising:
a first frame and a second frame;
a first arm member that includes a first end and a second end, wherein the first end is supported by the first frame to be pivotal about a first pivot shaft supported by the first frame, and the second end is supported by the second frame to be pivotal about a second pivot shaft supported by the second frame;
an actuator configured to move the second frame by pivoting the first arm member about the first frame; and
a second arm member that includes a first end and a second end, and extends in parallel with an axis of the first arm member, wherein the first end of the second arm member is supported by the first frame to be pivotal about a third pivot shaft supported by the first frame, and the second end of the second arm member is supported by the second frame to be pivotal about a fourth pivot shaft supported by the second frame, wherein
the actuator includes:
a driving unit;
an actuating rod configured to move in an axial direction of the first arm member in accordance with actuation of the driving unit; and
a link member that includes a distal end and a proximal end, wherein the proximal end and the first end of the second arm member are pivotally connected to the first frame, and the distal end is connected to the actuating rod,
the first arm member, the second arm member, the first frame, and the second frame form a parallel link,
the first arm member is hollow and accommodates the actuator and the second arm member, and
the actuator includes a cylinder tube, which is a tube that accommodates the driving unit and the actuating rod, the cylinder tube making the first arm member hollow.
2. The arm-type support device according to claim 1, wherein
the first arm member includes two arm guides extending in the axial direction of the first arm member and being opposed to each other with a space,
the second arm member is arranged between the arm guides, and
inner surfaces of the arm guides define an opening and the opening is closed by the second arm member.
3. An arm-type support device comprising:
a first frame and a second frame;
a first arm member that includes a first end and a second end, wherein the first end is supported by the first frame to be pivotal about a first pivot shaft supported by the first frame, and the second end is supported by the second frame to be pivotal about a second pivot shaft supported by the second frame;
an actuator configured to move the second frame by pivoting the first arm member about the first frame; and
a second arm member that includes a first end and a second end, and extends in parallel with an axis of the first arm member, wherein the first end of the second arm member is supported by the first frame to be pivotal about a third pivot shaft supported by the first frame, and the second end of the second arm member is supported by the second frame to be pivotal about a fourth pivot shaft supported by the second frame, wherein
the actuator includes:
a driving unit;
an actuating rod configured to move in an axial direction of the first arm member in accordance with actuation of the driving unit; and
a link member that includes a distal end and a proximal end, wherein the proximal end and the first end of the second arm member are pivotally connected to the first frame, and the distal end is connected to the actuating rod,
the first arm member, the second arm member, the first frame, and the second frame form a parallel link,
the first arm member is hollow and accommodates the actuator and the second arm member,
the first end of the first arm member has a shape of a plate, the first frame includes two first shaft supports that are bifurcated, the first pivot shaft is inserted into the first end of the first arm member and the first shaft supports that sandwich the first end, and the first end is pivotal about the first pivot shaft supported by the first shaft supports, and
the second end of the first arm member is bifurcated, the second frame includes a second shaft support having a shape of a plate, the second pivot shaft is inserted into the second shaft support of the second frame and the second end that sandwiches the second shaft support, and the second end is pivotal about the second pivot shaft supported by the second shaft support.
4. An arm-type support device comprising:
a first frame and a second frame;
a first arm member that includes a first end and a second end, wherein the first end is supported by the first frame to be pivotal about a first pivot shaft supported by the first frame, and the second end is supported by the second frame to be pivotal about a second pivot shaft supported by the second frame;
an actuator configured to move the second frame by pivoting the first arm member about the first frame; and
a second arm member that includes a first end and a second end, and extends in parallel with an axis of the first arm member, wherein the first end of the second arm member is supported by the first frame to be pivotal about a third pivot shaft supported by the first frame, and the second end of the second arm member is supported by the second frame to be pivotal about a fourth pivot shaft supported by the second frame, wherein
the actuator includes:
a driving unit;
an actuating rod configured to move in an axial direction of the first arm member in accordance with actuation of the driving unit; and
a link member that includes a distal end and a proximal end, wherein the proximal end and the first end of the second arm member are pivotally connected to the first frame, and the distal end is connected to the actuating rod,
the first arm member, the second arm member, the first frame, and the second frame form a parallel link,
the first arm member is hollow and accommodates the actuator and the second arm member,
the distal end of the link member is pivotally supported by the actuating rod,
a guide roller is rotationally supported by the actuating rod, and
a guide member configured to move the guide roller in the axial direction of the first arm member is arranged in the first arm member.

5. An arm-type support device comprising:
a first frame and a second frame;
a first arm member that includes a first end and a second end, wherein the first end is supported by the first frame to be pivotal about a first pivot shaft supported by the first frame, and the second end is supported by the second frame to be pivotal about a second pivot shaft supported by the second frame;
an actuator configured to move the second frame by pivoting the first arm member about the first frame; and
a second arm member that includes a first end and a second end, and extends in parallel with an axis of the first arm member, wherein the first end of the second arm member is supported by the first frame to be pivotal about a third pivot shaft supported by the first frame, and the second end of the second arm member is supported by the second frame to be pivotal about a fourth pivot shaft supported by the second frame, wherein
the actuator includes:
  a driving unit;
  an actuating rod configured to move in an axial direction of the first arm member in accordance with actuation of the driving unit; and
  a link member that includes a distal end and a proximal end, wherein the proximal end and the first end of the second arm member are pivotally connected to the first frame, and the distal end is connected to the actuating rod,
the first arm member, the second arm member, the first frame, and the second frame form a parallel link,
the first arm member is hollow and accommodates the actuator and the second arm member, and
a rod cover is arranged in the first arm member, the actuating rod extends through the rod cover, and the actuating rod is supported by the rod cover so that the actuating rod moves in the axial direction of the first arm member.

6. The arm-type support device according to claim 5, wherein
the first arm member includes a cylindrical tube,
a central axis of the tube extends in the axial direction of the first arm member,
the rod cover and a head cover define a piston chamber inside the tube,
the driving unit includes the piston chamber and a piston accommodated in the piston chamber,
the piston is connected to the actuating rod,
when the piston is moved by the link member and the actuating rod in the piston chamber as a position of the parallel link is changed, pressure of fluid is adjusted in accordance with a change in capacity of the piston chamber, and
the head cover includes an on-off valve that closes the piston chamber when supply of the fluid to the piston chamber is stopped.

\* \* \* \* \*